United States Patent
Mori (10) Patent No.: US 7,899,970 B2
(45) Date of Patent: Mar. 1, 2011

(54) CONNECTIVITY HUB WITH A STATIONARY BASE STATION AND A REMOVABLE SECOND HUB

(75) Inventor: Kenneth Mori, Los Angeles, CA (US)

(73) Assignee: Belkin International, Inc., Compton, CA (US)

(*) Notice: Subject to any disclaimer, the term of this patent is extended or adjusted under 35 U.S.C. 154(b) by 102 days.

(21) Appl. No.: 11/951,279

(22) Filed: Dec. 5, 2007

(65) Prior Publication Data

US 2008/0133815 A1    Jun. 5, 2008

Related U.S. Application Data

(60) Provisional application No. 60/868,686, filed on Dec. 5, 2006.

(51) Int. Cl.
G06F 13/00 (2006.01)
G06F 13/36 (2006.01)
G06F 13/20 (2006.01)

(52) U.S. Cl. ............... 710/313; 710/303; 710/306; 710/314

(58) Field of Classification Search .......... 710/313, 710/303, 306, 314
See application file for complete search history.

(56) References Cited

U.S. PATENT DOCUMENTS

| | | | |
|---|---|---|---|
| 6,141,221 A | 10/2000 | Tong et al. | |
| 6,253,329 B1 | 6/2001 | Kang | |
| 6,560,102 B1 | 5/2003 | Tong et al. | |
| 6,607,408 B2 | 8/2003 | Milan | |
| 6,662,259 B1 | 12/2003 | Lin et al. | |
| 6,716,047 B2 | 4/2004 | Milan | |
| 6,722,917 B2 | 4/2004 | Huang | |
| 7,167,372 B2 | 1/2007 | Mori et al. | |
| 7,312,817 B2* | 12/2007 | Schinner | 348/207.2 |
| 7,510,420 B2* | 3/2009 | Mori | 439/446 |
| 2002/0081878 A1* | 6/2002 | Bruno | 439/164 |
| 2003/0199203 A1* | 10/2003 | Milan | 439/701 |
| 2005/0282417 A1* | 12/2005 | Tsao | 439/131 |
| 2007/0058332 A1* | 3/2007 | Canterbury et al. | 361/683 |

* cited by examiner

Primary Examiner—Mark Rinehart
Assistant Examiner—Jeremy S Cerullo
(74) Attorney, Agent, or Firm—O'Melveny & Myers LLP (57) ABSTRACT

A connectivity hub enabling multiple peripheral devices to be connected with a computer includes a stationary base station functioning as a connectivity hub and a removable connectivity hub functioning by itself as a travel connectivity hub. The removable travel hub can be plugged into the stationary base station by connecting an upstream port of the removable hub to a downstream port of the base station. Thus, a user of the connectivity hub achieves the functionality of a full-featured connectivity base station as well as that of a small, easily transportable travel hub without having to purchase multiple units.

18 Claims, 8 Drawing Sheets

CONNECTIVITY HUB WITH A STATIONARY BASE STATION AND A REMOVABLE SECOND HUB

RELATED APPLICATION DATA

This application claims the benefit, pursuant to 35 U.S.C. §119(e), of U.S. provisional application Ser. No. 60/868,686, filed Dec. 5, 2006.

BACKGROUND OF THE INVENTION

1. Field of the Invention

The present invention relates generally to a connectivity hub, such as a Universal Serial Bus ("USB") hub, and more particularly to a first connectivity hub with a selectively removable second connectivity hub that interconnects with the first connectivity hub.

2. Description of Related Art

In many applications, it is advantageous to interconnect a single computer port to multiple peripheral devices. A connectivity hub provides a convenient central data connection point for attaching multiple peripheral devices to a computer. The hub relays data from the computer to all enabled devices connected to the data hub, and relays data from the enabled devices to the computer. This data relay can be performed without any data storage or significant delay. The connectivity hub can be connected to the computer via a single upstream connector. The connectivity hub can include a plurality of downstream ports for connecting the peripheral devices to the hub. Some common examples of connectivity hubs include FireWire hubs and USB hubs. Both Firewire hubs and USB hubs utilize standardized connectors at the upstream and downstream ports to provide universal connectivity between peripheral devices and the computer, thus simplifying these connections.

Many connectivity hubs receive power for low power applications via a positive voltage conductor and a ground conductor from a source, such as a computer, through the upstream port. Conventional connectivity hubs can be equipped with a connector for connecting with a transformer plugged into a typical AC outlet for providing DC power to the hub for high-power applications.

One example of a connectivity hub is a USB hub. The USB standard is a communication interface standard that enables data transmission/reception between a single USB host and a plurality of USB devices. USB standard compliant interfaces have been widely used as a communication interface that mainly defines a PC as the USB host and its peripheral devices as the USB devices to enable connection between the PC and the peripheral devices. The USB standard adopts a star-shaped logical bus topology in which a single USB host is connected with plural USB devices. The USB 2.0 standard defines three bus transport speeds: a low speed ("LS") of 1.5 Mbit/s, a full speed ("FS") of 12 Mbit/s, and a high speed ("HS") of 480 Mbit/s. Most USB 2.0 hubs are backward compatible to the USB 1.1 standard that includes the LS and FS bus transport speeds.

Connectivity hubs are available in a variety of shapes and sizes with a varying number of ports, commonly ranging from 2 to 7 ports. Small portable hubs often meant to be used with a laptop computer are commonly referred to as "travel hubs" with two to four available bus-powered ports, since most devices used with laptops away from the user's home or office (i.e., when the user is "on the road") tend to be smaller, low power devices. Often, when a laptop user docks her computer at home or work, she needs a connectivity hub that has more than the two to four bus-powered ports. That is, she is in need of DC-powered ports, as described above. Until now, this meant that the laptop user needed to purchase two hubs, a travel hub and a larger conventional hub to get additional ports with the DC powered port option.

Users can increase the number of connectivity ports available to them for connecting peripheral devices by daisy-chaining hubs together with upstream cables between the hubs. Some hubs are designed to be "stacked" so that a plurality of similar hubs are affixed to each other to form a rigid structure that saves space. Stackable hubs can have integrated upstream and power connectors that mate when the hubs are stacked, thus eliminating some of the cables needed to daisy-chain the hubs. Until now, stackable hub designs required that the hubs being stacked were all the same type of hub with the same number of ports.

In particular, Laptop computers often have only two type "A" USB ports available, and they are commonly located either on the back or side of the laptop computer, and little clearance is provided around the connectors for plugging in travel hubs or larger USB devices designed to be plugged into the USB ports. To reduce the size of travel hubs and the number of cables the user must carry around while traveling, it would be preferable if the travel hub could plug directly into one of the laptop computer's USB ports similar to a USB flash memory drive. A number of such devices with one, two or even three USB ports molded into one rigid molded unit are currently available. Unfortunately, this solution is often not practical without the use of an upstream extension cable, because a conventional hub tends to block the user's access to other cables and devices plugged into the laptop. The use of an extension cable thus defeats many of the benefits of using a single molded hub unit. Thus, many travel hub manufacturers settle for an alternative solution of having an integrated male type "A" USB connector and upstream cable permanently attached to the travel hub. When not in use, the upstream cable can be stored by folding it, coiling it into a bundle, or wrapping it around the circumference of the travel hub. An improved USB hub design that would allow the user to easily connect her travel hub directly to the USB ports on her laptop computer could allow the user to eliminate the requirement of using the upstream cable and the extension cable when a laptop user connects a travel hub to one of her laptop computer's USB ports. Eliminating the need for this upstream cable would save weight and space for the traveling laptop user.

Accordingly, there is a need for a method of stacking a small non-powered travel hub with a larger DC-powered base-station hub that would eliminate interconnecting cables, and save weight and space for the user. Additionally, the ability to convert the travel hub to a DC-powered hub when interconnected would reduce the need for the user to purchase additional USB hubs to stack, thus providing an improvement over currently available stackable hubs.

SUMMARY OF THE INVENTION

A connectivity hub enabling multiple peripheral devices to be connected with a computer includes a stationary base station functioning as a connectivity hub and a selectively removable connectivity hub functioning by itself as a travel connectivity hub. The selectively removable travel hub can be plugged into the stationary base station by connecting an upstream port of the removable hub to a downstream port of the base station. Thus, the user achieves the functionality of a full-featured connectivity base station as well as that of a small, easily transportable travel hub without having to purchase multiple units.

In the discussion that follows, embodiments of the connectivity hub comprising a stationary base station and a removable travel hub are described making reference to USB port connectors. However, it should be appreciated that FireWire ports, other serial data ports, parallel ports, power ports, and other ports adapted for connecting peripheral devices to a computer are within the spirit and scope of the invention. In one embodiment of the invention, the connectivity hub provides a data and a power connection between a USB port on a computer and a plurality of USB peripheral devices. The connectivity hub comprises a stationary base station designed to be placed on a work surface such as a desk or table and connected to a USB port on a computer. In one embodiment of the present invention, the connection between the computer and the connectivity hub is made using an external cable that connects to a USB port on the computer and to an upstream USB port on the connectivity hub. In another embodiment, the connectivity hub comprises a permanently connected cable terminating in a USB plug that is used to connect to the computer. The cable may be wrapped around the outside of the connectivity hub for storage when not in use.

In one embodiment of the present invention, the base station hub comprises a stand designed to stabilize the hub when it is placed on a work surface, and a substantially flat rear surface designed to fix in place a plurality of port connectors, including at least one upstream connector for connecting to a computer and at least one downstream connector for connecting to a peripheral device.

In the preferred embodiment of the present invention, the connectivity hub includes a DC power connector for powering the connectivity hub by connecting it to an external DC power supply, which may comprise an AC transformer that plugs into a wall outlet in accordance with power supply designs well known in the art. Optionally, the base station may also be powered directly through a USB port connected to the computer when the connected peripheral devices are low-current devices. The connectivity hub also includes a rim portion that provides mechanical support for a second, selectively removable connectivity hub that may be electrically integrated into the base station connectivity hub. In one embodiment of the invention, the rim is elliptical in shape, corresponding to an elliptical shape of the removable travel hub that may be placed within the rim. However, it should be appreciated that other shapes for the rim and for the cross section of the removable travel hub also fall within the scope and spirit of the present invention.

In one embodiment of the present invention, the removable travel hub includes an upstream USB port that is adapted to plug into a downstream port fixed on a surface of the stationary base station hub within the region defined by the rim. However, it should be appreciated that other types of port connectors, including FireWire ports, other serial data ports, parallel ports, power ports, and other ports adapted for connecting peripheral devices to a computer are within the spirit and scope of the invention. The removable travel hub may also include a DC power connector that is configured to plug into an output DC power connector fixed on a surface of the stationary base station hub within the region defined by the rim. When the removable travel hub is plugged into the stationary base station hub, the downstream ports on the travel hub may be powered through the DC power connector, thus enabling the travel hub to power peripheral devices requiring higher current.

In one embodiment of the present invention, when the removable travel hub is removed from the base station, it functions as a bus-powered connectivity hub, allowing multiple low-current peripheral devices to be connected to a desktop or laptop computer. Because of space limitations, particularly near laptop port connectors, one embodiment of the present invention includes a swivel plate attached to the upstream port of the removable travel hub to allow the hub to rotate with respect to the connector by up to 180 degrees in order to accommodate other plugs and wires protruding from other laptop port connectors. However, it should be appreciated that port connectors able to swivel more or less than 180 degrees are also within the scope and spirit of the present invention.

In one embodiment of the present invention, the base station hub further includes an LED indicator lamp. The LED may be configured to illuminate when an upstream port of the base station connectivity hub is connected to a computer. Alternatively or additionally, the LED indicator may indicate when a peripheral device is connected to a downstream port of either the base station hub or the docked removable travel hub by illuminating with an alternative color.

A more complete understanding of the connectivity hub with a stationary base-station hub and a selectively removable travel hub will be afforded to those skilled in the art, as well as a realization of additional advantages and objects thereof, by consideration of the following detailed description of the preferred embodiment. For purposes of convenience and clarity, the preferred embodiment is described with reference to USB port connectors. However, it should be appreciated that FireWire ports, other serial data ports, parallel ports, power ports, and other ports adapted for connecting peripheral devices to a computer are all within the spirit and scope of the invention. Reference will be made to the appended sheets of drawings which will first be described briefly.

DETAILED DESCRIPTION OF THE PREFERRED EMBODIMENT

The present invention provides an apparatus having a first connectivity hub and a selectively removable second connectivity hub that interlocks with the first connectivity hub. The second connectivity hub can operate as a DC-powered hub when connected to the first connectivity hub and can operate as a bus-powered hub when separated. In one embodiment of the present invention, the second connectivity hub has a rotating plug connector that provides clearance from adjacent port connectors when a user connects the second connectivity hub to an available port connector on a laptop computer. In the detailed description that follows, like element numerals are used to indicate like elements appearing in one or more of the figures.

Figure 1:
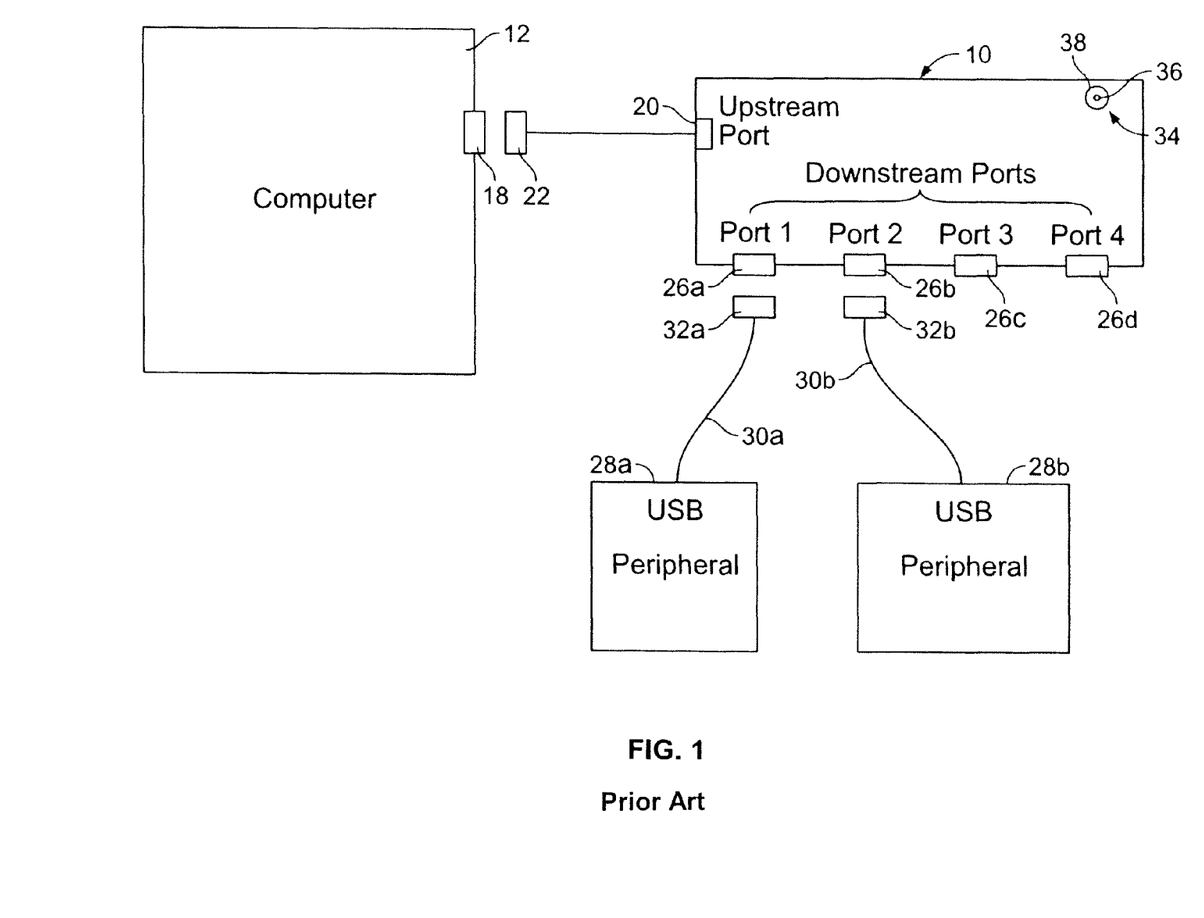
FIG. 1 is a block diagram illustrating a conventional connectivity hub.

FIG. 1 is a block diagram illustrating the connection of a conventional connectivity hub 10 to a computer 12. For purposes of illustration, a USB hub is described, although it should be recognized that other types of connectivity hub connectors, such as FireWire ports, other serial ports, parallel ports, power ports, and other ports adapted to connect peripheral devices to a computer are all within the scope and spirit of the present invention. The computer 12 has a USB interface that includes a master data hub for receiving data from the connectivity hub 10. The computer 12 includes at least one USB port connector 18. The connectivity hub 10 includes an upstream port connector 20 having a corresponding USB plug 22 that connects to the USB connector 18 of the computer 12.

The connectivity hub 10 also includes a plurality of downstream USB port connectors 26a-26d to permit multiple USB peripheral devices 28a and 28b, such as a keyboard, mouse, scanner, or printer, to be coupled to the computer 12 through the connectivity hub 10. The USB peripheral devices 28a and 28b are each connected by connection cables 30a and 30b to USB plugs 32a and 32b, which mate with the downstream port connectors 26a-26d of the connectivity hub 10.

In one embodiment of the present invention, the connectivity hub 10 contains connections for receiving power in two ways. First, the USB hub may be bus powered for applications in which total current provided to the hub is less than approximately 500 mA. In bus-powered applications, the connectivity hub receives power through the upstream port 20 from the USB plug 22 that contains separate positive and ground conductors. The USB hub can transfer a limited amount of current, approximately 100 mA, to each of four devices through the downstream ports via positive and ground conductors in the downstream port connectors 26a-26d.

The connectivity hub 10 also includes a separate power connector 34 for receiving sufficient power to supply higher current to the downstream ports in high-power applications. The available current draw through the downstream ports in such high-powered applications is approximately 500 mA per port. However, it should be appreciated that other current-carrying capacities are within the scope and spirit of the present invention. The power connector 34 includes a positive voltage conductor 36 and a ground conductor 38 for receiving a DC voltage, preferably 5 volts, from a transformer (not shown) connected to an AC powered outlet (also not shown).

Figure 2A:
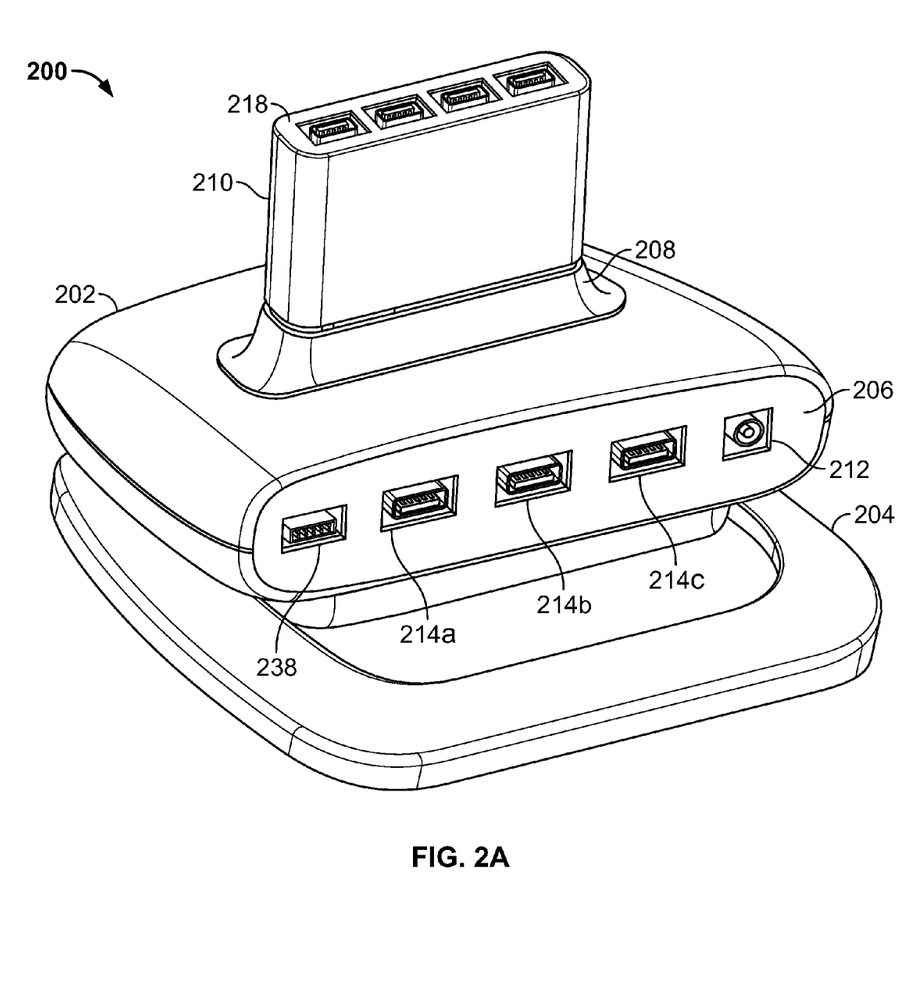
FIGS. 2A, 2B, and 2C are different perspective views of an exemplary embodiment of a first connectivity hub with a second connectivity hub removably attached to the first hub, in accordance with the present invention.
Figure 2B:
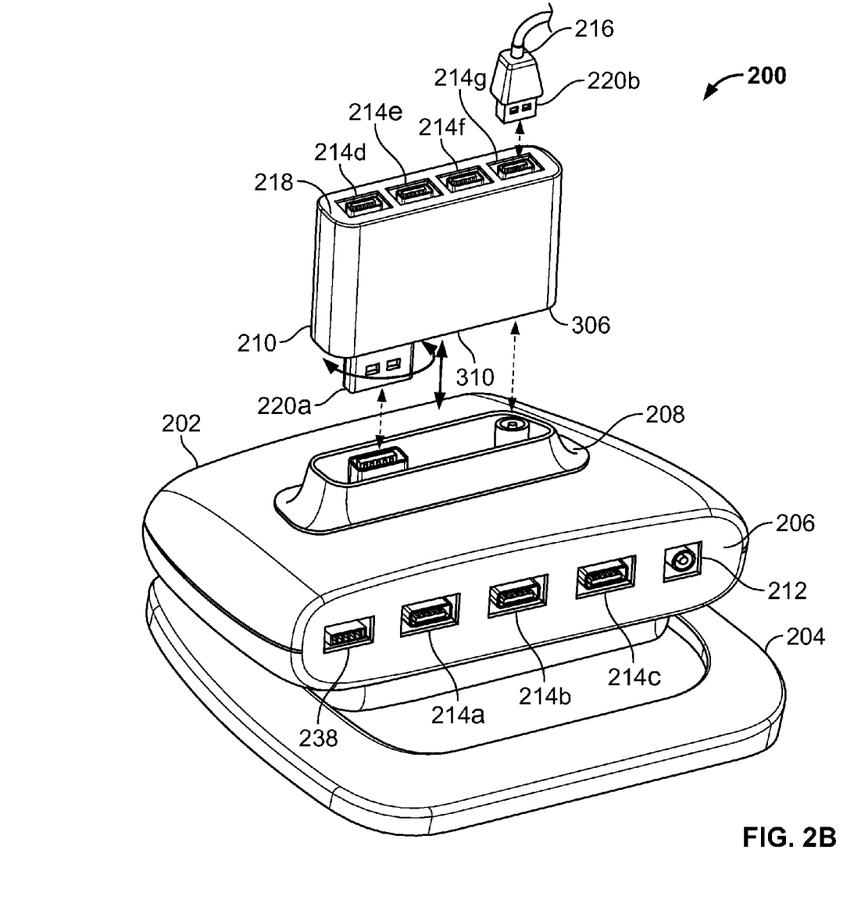
Figure 2C:
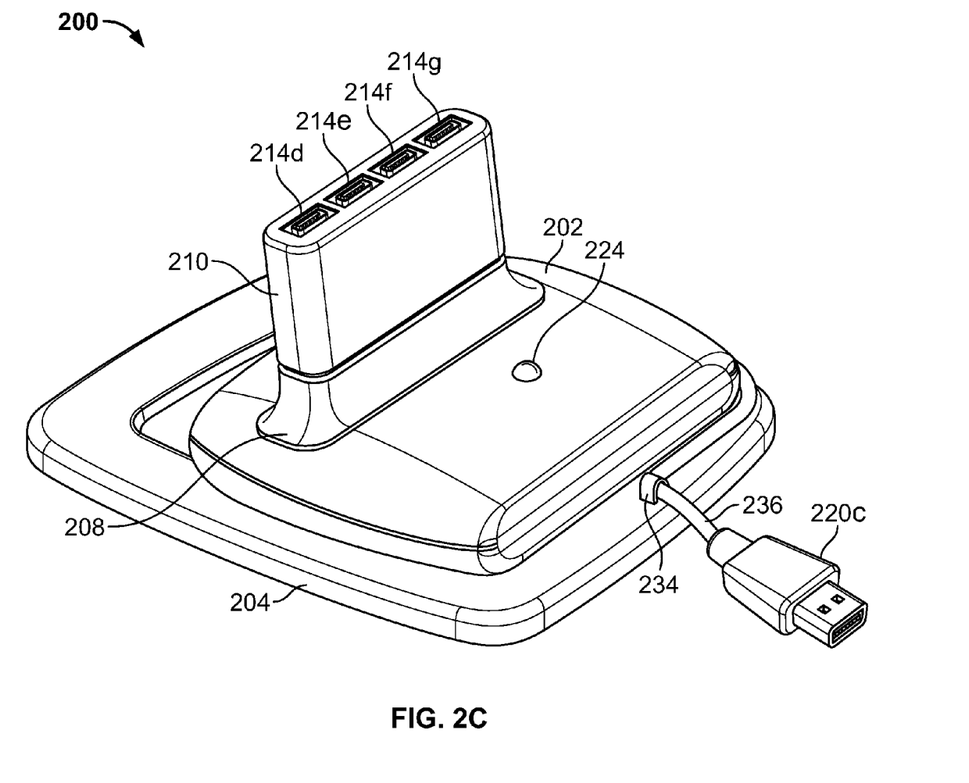

FIGS. 2A-2C are different perspective views of an exemplary embodiment of a connectivity hub apparatus 200 in accordance with the present invention, comprising a first connectivity hub 202 with a second connectivity hub 210, selectively removable from the first hub 202, shown from two different angles. For purposes of illustration, the connector ports shown are USB ports, although it should be appreciated that other types of connectivity ports, such as FireWire ports, other serial ports, parallel ports, or power ports, fall within the scope and spirit of the present invention. In FIGS. 2A and 2C, the removable connectivity hub 210 is shown attached to the stationary connectivity hub 202, while in FIG. 2B, the removable connectivity hub 210 has been detached from the stationary connectivity hub 202. The first hub 202 comprises a stand 204, a back panel 206, an elliptically shaped rim 208, three type "A" USB port connectors 214a-214c, a type "B" USB port connector 238, and a power connector 212. However, it should be appreciated that other numbers of connectors in other configurations are within the scope and spirit of the present invention. In one embodiment, the rim 208 is shaped elliptically since that is the shape of the bottom portion of the removable connectivity hub 210. In other embodiments, the rim 208 can be shaped differently As shown in FIG. 2C, one embodiment of the present invention further comprises an LED indicator 224, a USB cable 236, a type "A" USB plug 220c, and a cable clip 234. In one embodiment, the removable connectivity hub 210 comprises a type "A" rotatable USB plug 220a, a top panel 218, four type "A" USB ports 214d-214g, a bottom surface 310, and a power connector 306 (see FIG. 3D) on the bottom side of the connectivity hub 210, and a type "A" USB plug 216 that selectively connects to one of the USB ports 214d-214g.

As can be seen in the exemplary embodiment illustrated in FIGS. 2A and 2B, the body of the connectivity hub 210 in this embodiment has an elliptical cross section and can be placed on a workspace, tabletop, or other flat surface in a stationary position using the stand 204. USB port connector 238 is an upstream port protruding from the back panel 206 that can either be daisy-chained to other USB hubs or directly connected to a master data hub inside a computer. A user can operatively connect peripheral devices such as a keyboard, mouse, printer, scanner, etc. to downstream USB ports 214a and 214b, protruding from back panel 206. Power connector 212 can be connected to an AC transformer or other power supply that provides a DC voltage of approximately 5V and up to 500 mA of current per port 214a for high-current, DC-powered peripherals. When the hub 218 is operatively connected to the rim 208, the upstream data traveling through port 238 is in communication with the downstream ports 214b, and the DC power supplied to the connectivity hub 210 becomes operatively connected to ports 214b as well. Thus, when connectivity hub 210 is operatively connected to the rim 208, USB hubs 202 and 210 function as one connectivity hub with downstream port connectors 214a-214g.

The interconnection of the first connectivity hub 202 to the second connectivity hub 202 provides the benefit of making available to the user the convenience of having top mounted port connectors 214d-214g. Peripheral devices such as digital cameras and flash memory drives are frequently connected and disconnected from port connectors, and having available the USB port connectors 214d-214g on the upward facing side of a connectivity hub saves the user from having to reach to the back or side of the hub to reach the available port connectors.

FIG. 2B shows how connectivity hub 210 can be detached from connectivity hub 202 by simply pulling connectivity hub 210 out of the rim 208. The removable hub 210 can then be used as a bus-powered travel hub, wherein, USB plug 220a functions as an upstream port for connection to an available USB port on a laptop computer or another USB hub other than USB hub 202. The USB plug 220a can be rotated up to approximately 180 degrees, though other rotational angles are possible in other embodiments. This allows connectivity hub 210 to easily fit in tight spaces when connected to a USB port on a laptop computer or other compatible upstream USB port. The USB plug 220b and cable 216 can be from a USB peripheral that operatively connects to any of the USB ports 214d-214g that protrude from top panel 218.

Additional features of one embodiment of connectivity hub 210 that are visible in FIG. 2C include an indicator 224, a USB cable 236, a cable support 234, and a USB plug 220c. USB cable 236 has a type "B" USB plug on the end distal to cable support 234, and can be operatively connected to USB jack 238 (see FIGS. 2A and 2B). Cable 236 is tucked between the body of connectivity hub 202 and the stand 204. Depending on the length of the cable 236 in a particular embodiment, the cable 236 can be wrapped around the body of hub 202 multiple times similar to a cord reel. The proximal end of cable 236 is held in place against the stand 204 by cable support 234 and the cable 236 can be removed from the support 234 to alter the length of the cable 236 protruding from the stand 204. Excess cable slack may be neatly contained in the gap between the hub 202 and the stand 204 so that the optimal length of the cable 236 needed to reach the user's computer protrudes from the hub 202. The USB plug 220c and cable 216 can operatively connect to an available USB port on the user's computer to transmit and receive data from the connectivity hub 202 and the removable hub 210 when it is operatively connected to the rim 208. An advantage to having the USB cable 236 and the USB plug 220c protruding from the front of the connectivity hub 202 is that it saves the user time and effort in having to reach around to the back of the hub to connect and disconnect an upstream cable from the connectivity hub 202 and the user's computer. This can become an important consideration for a user that frequently connects and disconnects the hub 202 from the computer.

In one embodiment of the present invention, an indicator 224 can comprise a mono-colored Light Emitting Diode ("LED") that lights up when the connectivity hub 202 is connected to an upstream signal through port connector 238. In other embodiments, indicator 224 is a multicolored LED that glows one color when there is an upstream port connection through port 238 and glows a second color when there is at least one peripheral or other downstream device operatively connected to port connector 238. One skilled in the art will recognize that many variations of the use of indicator 224 are possible in other embodiments. For example, another embodiment of the present invention comprises a hub 202 having a plurality of multicolored LEDs (or other types of light sources) that change colors when the individual port connectors 214a-214g are connected to the hub and/or when DC power is supplied to the hub through power connector 212.

Figure 2D:
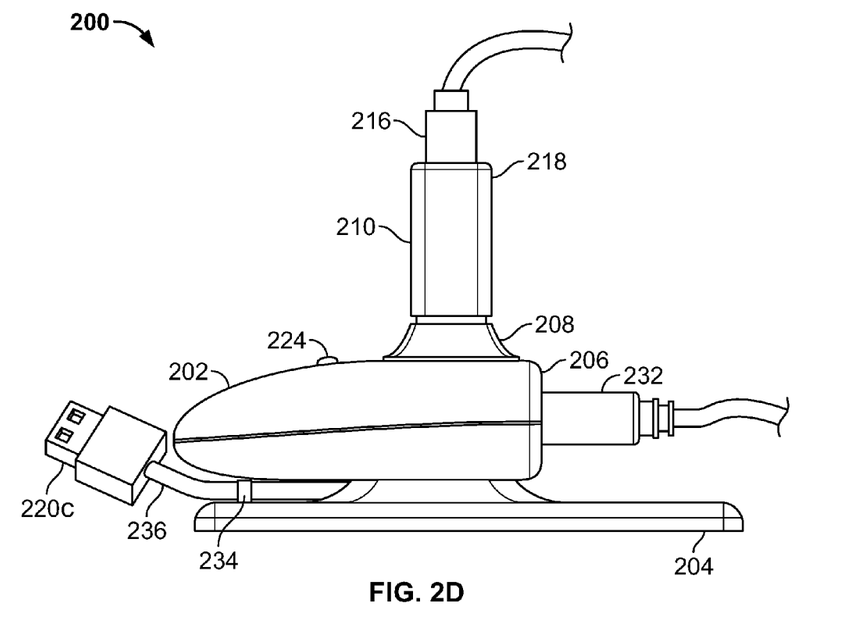
FIG. 2D is a left-side elevational view of the first connectivity hub with the second connectivity hub removably attached to the first hub, in accordance with an embodiment of the present invention.

FIG. 2D is a left-side elevational view of the connectivity hub apparatus 200 comprising the first connectivity hub 202 with the second connectivity hub 210 removably attached to the first hub 202. In this view, the cable 236 can be seen tucked between the body of hub 202 and the stand 204, as described above with respect to FIG. 2B. Also visible is a USB plug and cable 232 operatively connected to one of the USB connector ports 214a-214c (not shown) and USB cable 216 and plug 220b (not shown) operatively connected to one of the USB ports 214d-214g. In this illustration, the stand 204 protrudes outward to the right of the body of the connectivity hub 204. This protrusion adds stability to the stand, especially when the user is connecting or disconnecting plugs to the ports on the back panel 206 or the top panel 218 of the connectivity hub 204. The USB cable 216 and plug 220b can be from a USB peripheral that operatively connects to any of the USB ports 214d-214g that protrude from top panel 218.

Figure 2E:
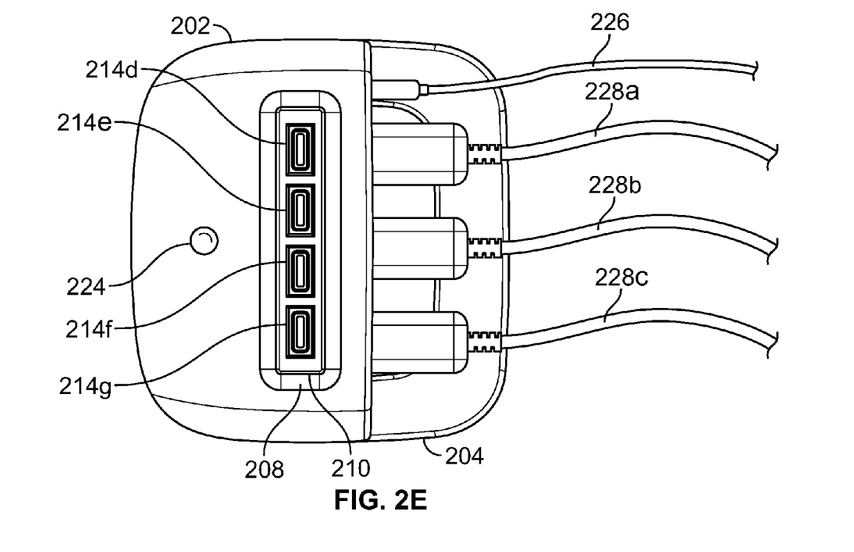
FIG. 2E is a top view of the first connectivity hub with the second connectivity hub removably attached to the first hub with peripheral plugs and a power cable shown connected to the first hub, in accordance with an embodiment of the present invention.

FIG. 2E is a top view, in accordance with one embodiment of the present invention, of the first connectivity hub 202 with the second connectivity hub 210 removably attached to the first hub with USB plugs and cables 228a-228c and a power cable 226 shown connected to the first hub 202. In the embodiment of FIG. 2E, the rim 208 and the connectivity USB hub 210 appear to be concentric, since the perimeter of the rim 208 is smaller than the perimeter of the hub 210 and the rim 208 circumscribes the base of the connectivity hub 210 when they are connected. The stand 204 has a void or hole with a "half-moon" shape located below the USB plugs and cables 228a-228c. The hole reduces the total weight of the connectivity hub 202. Also visible in this view are the USB ports 214d-214g and the indicator 224, which operate as described above.

Figure 3A:
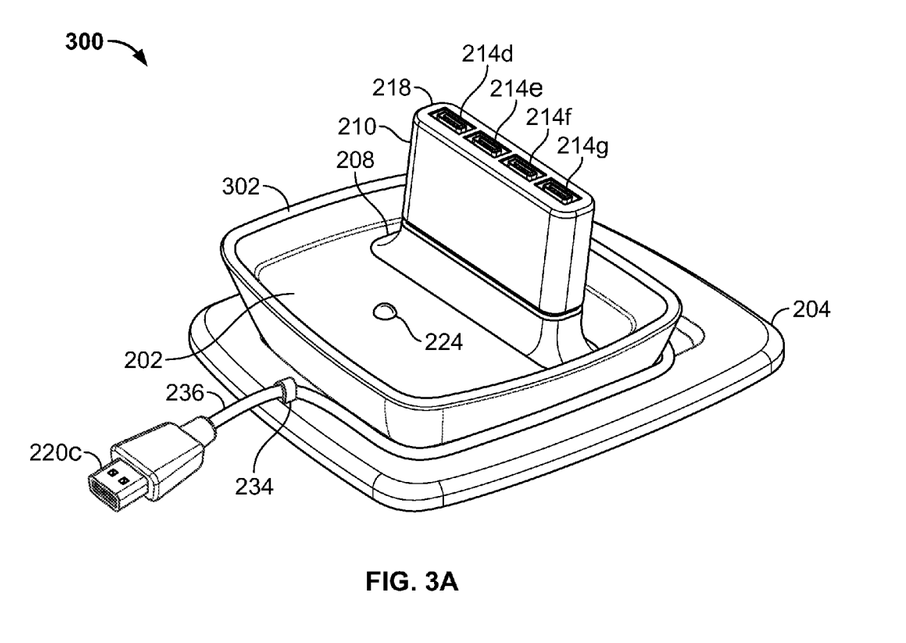
FIGS. 3A, 3B, and 3C are different perspective views of another exemplary embodiment of a first connectivity hub with a second hub removably attached to the first hub in accordance with the present invention.
Figure 3B:
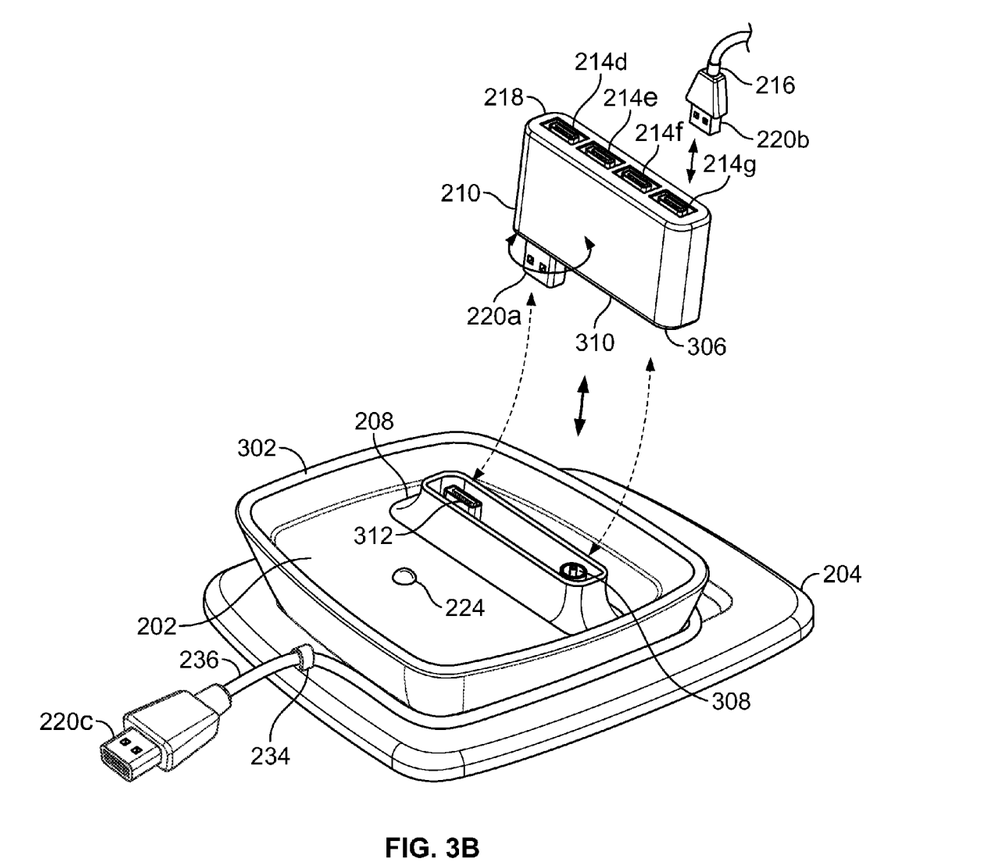
Figure 3C:
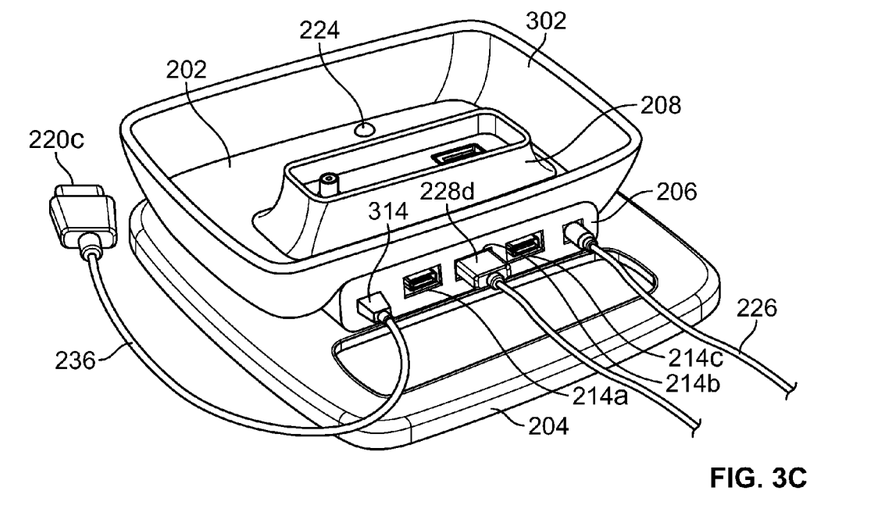

FIGS. 3A-3C are different perspective views of another exemplary embodiment of a connectivity hub apparatus 300 comprising a first hub 304 with a second hub 210 removably attached to the first hub 304. In FIG. 3A, the connectivity hub 210 is shown attached to the connectivity hub 202, while in FIGS. 3B and 3C, the connectivity hub 210 has been detached from the connectivity hub 202. This embodiment is essentially the same as the embodiment of FIGS. 2A-2E, except for the addition of a secondary rim 302 that protrudes vertically from the top surface of the first connectivity hub 202. In other variations of this embodiment, the height and angle of the secondary rim 302 from the top of the connectivity hub 202 can vary. As illustrated in FIG. 3C, the secondary rim 302 surrounds the outer edge of the hub 202 and is attached to the stand 204. The secondary rim 302 serves to create a storage space for cables and other loose items to be stored along the top surface of the USB hub 202.

Visible in FIG. 3C is the first connectivity hub 304 with type "A" USB plug 228d, type "B" USB plug 314, and a power cable 226 shown connected to the first connectivity hub 202 on the back panel 206. The USB plug 314 is operatively connected to the USB cable 236 and in turn to the USB plug 220c on the proximal end of the USB cable 236. As described with respect to FIG. 2B above, the USB plug 220c and cable 216 can operatively connect to an available USB port on the user's computer to transmit and receive data from the USB hub 202 and USB hub 210 when it is operatively connected to the rim 208.

Figure 3D:
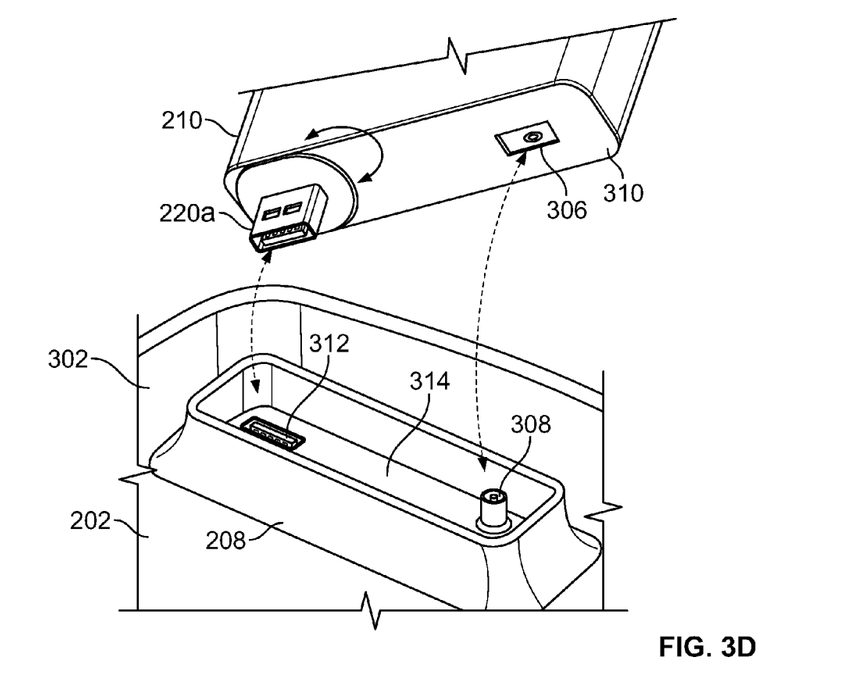
FIG. 3D is a detailed view of the exemplary embodiment of FIGS. 3A and 3B, illustrating how the second connectivity hub can be removed from the first connectivity hub in accordance with the present invention.

FIG. 3D is a detailed view of the exemplary embodiment of FIGS. 3A-3C, illustrating how the second connectivity hub 210 can be removed from the first connectivity hub 202. In the illustration, the rotatable USB plug 220a and the power connector 306 protrude from the bottom surface 310. As discussed with respect to FIG. 2B above, the USB plug 220a can be rotated up to approximately 180 degrees, though other rotational angles are possible in other embodiments. This allows the connectivity hub 210 to easily fit in tight spaces when connected to a USB port on a laptop computer or other compatible upstream USB port.

The USB plug 220a operatively connects to a USB port connector 312 when the connectivity hub 210 is operatively connected to the rim 208. Similarly, the power connector 306 operatively connects to power plug 308 when the connectivity hub 210 is operatively connected to the rim 208. The USB plug 220b and the power connector 306 removably attach to the USB connector 312 and the power plug 308, respectively, by friction fit. The friction fit serves to keep the USB hub secured or "docked" to the rim 208.

In another embodiment (not shown), a plurality of male tabs protruding from the top portion of the rim 208 that mate with a plurality of apertures on the bottom surface 310 can secure the connectivity hub 210 to the rim 208. In yet another embodiment (not shown), one or more thumb screws protrude from opposing sides of the rim 208 and when the connectivity hub 210 is docked to the rim 208, the one or more thumb screws engage one or more threaded inserts located on opposing sides of the body of the USB hub 210 to secure the connectivity hub 210 to the rim 208. One of skill in the art will recognize that other methods of securely fastening the connectivity hub 210 to the rim 208 are within the spirit and scope of the present invention.

In one embodiment of the present invention, when the connectivity hub 210 is docked with the rim 208, DC power can be supplied to the hub 202 via the power cable 226. The DC power can in turn be supplied to the USB port connectors 214*d*-214*g* by the power connector 310 operatively connected to the power plug 308. This allows the connector ports 214*d*-214*g* to support high current, DC powered peripherals that are connected thereto. In this embodiment, when the connectivity hub 210 is docked to the rim 208, all seven downstream port connectors 214*a*-214*g* are DC powered. One skilled in the art will recognize that in other embodiments, other numbers of DC-powered port connectors are possible.

In accordance with one aspect of the embodiments described herein, there is provided a first connectivity hub comprising: a housing; at least one side with one or more bus ports; a power connector for DC powered hub applications; and a second side. The second side of the first connectivity hub can comprise: one or more ports; and a power connector for DC powered hub applications, wherein a second connectivity hub can be removably connected thereto. The second connectivity hub comprises a first side with one or more bus ports; and a second side. The second side of the second connectivity hub can comprise: a rotatable bus port connector; and a DC power connector that removably connect to the second side of the first connectivity hub. The second connectivity hub can be separated from the first hub by an upward application of force (pulling apart) to the exterior surface of the second connectivity hub.

Having thus described a preferred embodiment of a first connectivity hub with a removable second connectivity hub that interconnects or interlocks with the first connectivity hub, it should be apparent to those skilled in the art that certain advantages of the invention have been achieved. For example, the use of the removably attached travel hub that has an integrated swiveling upstream type A male USB connector has been illustrated, but it should also be appreciated that various modifications, adaptations, and alternative embodiments thereof may be made within the scope and spirit of the present invention. The invention is further defined by the following claims.

What is claimed is:

1. A connectivity hub comprising:
a hub body comprising a first hub portion and a selectively removable second hub portion, wherein the first hub portion comprises:
a first plurality of surfaces;
a first plurality of port connectors on a first one of said first plurality of surfaces comprising at least one upstream port connector for connecting to a computer and at least one downstream port connector for connecting to a peripheral device and at least one other downstream port connector on a second one of said first plurality of surfaces adapted to connect to the second hub portion;
at least one electrical circuit, operatively coupled to the plurality of port connectors and the at least one other downstream port connector, and adapted to permit signals to flow between the plurality of port connectors and the at least one other downstream port connector;
at least one power circuit adapted to supply power to the at least one downstream port connector and to the second hub portion; and
a rim portion on the second one of said first plurality of surfaces and substantially surrounding the at least one other downstream port connector;
wherein the second hub portion comprises:
a second plurality of surfaces; and
a second plurality of port connectors comprising at least one upstream port connector on a first one of said second plurality of surfaces for connecting to the at least one other downstream port connector of the first hub portion, and at least one downstream port connector on a second one of said second plurality of surfaces for connecting to the peripheral device;
wherein said rim portion fixes in place the second hub portion such that the at least one upstream port connector of the second hub portion can be disconnected from the at least one other downstream port connector of the first hub portion by pulling the second hub portion away from the rim portion of the first hub portion; and
wherein the second hub portion further comprises a rotation interface plate adapted to fix the position of the at least one upstream port connector and to permit rotation of the at least one upstream port connector from a first position to at least a second position, said first position being on said first one of said second plurality of surfaces and parallel to the at least one downstream port connector, and said second position being on said first one of said second plurality of surfaces and orthogonal to said at least one downstream port connector.

2. The connectivity hub of claim 1, wherein each of the plurality of first and second port connectors comprises at least one of a USB port, a FireWire port, a serial port, a parallel port, and a power port.

3. The connectivity hub of claim 1, wherein the first hub portion further comprises:
a stand adapted to stabilize the connectivity hub on a work surface; and
a substantially flat back portion adapted to fix in place at least one of the first plurality of port connectors; and
a mating surface located within the rim portion and adapted to fix in place the at least one other downstream port connector for connecting to the second hub portion.

4. The connectivity hub of claim 1, wherein the first hub portion further comprises a cable connected to the at least one electrical circuit of the first hub portion and to the at least one upstream port connector of the first hub portion.

5. The connectivity hub of claim 1, wherein the first hub portion further comprises an input DC power connector and an output DC power connector wherein the at least one power circuit is adapted to route power from the input DC power connector to the at least one downstream port and to the output DC power connector.

6. The connectivity hub of claim 5, wherein the second hub portion further comprises a secondary DC input power connector adapted to connect to the output DC power connector of the first hub portion.

7. The connectivity hub of claim 1, wherein the first hub portion is further adapted to include an LED indicator light, wherein the indicator light is adapted to illuminate when the at least one upstream port of the first hub portion is connected to the computer.

8. The connectivity hub of claim 7, wherein the LED indicator light is further adapted to display a first color and a second color, wherein the first color is displayed when the at least one upstream port of the first hub portion is connected to the computer, and wherein the second color is displayed when the at least one downstream port of the first hub portion is connected to the peripheral device.

9. The connectivity hub of claim 1, wherein the first one of said first plurality of surfaces is a side surface of the first hub portion, and the second one of said first plurality of surfaces is a top surface of the first hub portion.

10. The connectivity hub of claim 1, wherein the first one of said second plurality of surfaces is a bottom surface of the second hub portion, and the second one of said second plurality of surfaces is a top surface of the second hub portion.

11. The connectivity hub of claim 9, wherein the first one of said first plurality of surfaces is a back surface of the first hub portion, the first one of said second plurality of surfaces is a bottom surface of the second hub portion, and the second one of said second plurality of surfaces is a top surface of the second hub portion.

12. A connectivity hub comprising:
a hub body comprising a first hub portion and a selectively removable second hub portion, wherein the first hub portion comprises:
a first plurality of surfaces;
a first plurality of port connectors on a first one of said first plurality of surfaces comprising at least one upstream port connector for connecting to a computer and at least one downstream port connector for connecting to a peripheral device and at least one other downstream port connector on a second one of said first plurality of surfaces adapted to connect to the second hub portion;
at least one electrical circuit, operatively coupled to the plurality of port connectors and the at least one other downstream port connector, and adapted to permit signals to flow between the first plurality of port connectors and the at least one other downstream port connector;
at least one power circuit adapted to supply power to the at least one downstream port connector and to the second hub portion;
an input DC power connector operatively connected to the power circuit, and an output DC power connector for connecting to the second hub portion;
a stand adapted to stabilize the connectivity hub when placed on a work surface;
a substantially flat back adapted to fix in place at least the first plurality of port connectors and the input DC power connector; and
a rim portion on the second one of said first plurality of surfaces and substantially surrounding the at least one other downstream port connector,
wherein the rim portion further comprises a mating surface adapted to fix in place the at least one other downstream port connector for connecting to the second hub portion;
wherein the second hub portion comprises:
a second plurality of surfaces; and
a second plurality of port connectors comprising at least one upstream port connector on a first one of said second plurality of surfaces for connecting to the at least one other downstream port connector of the first hub portion, and at least one downstream port connector on a second one of said second plurality of surfaces for connecting to the peripheral device, and a secondary input DC power connector for connecting to the output DC power connector of the first hub portion;
wherein said rim portion fixes in place the second hub portion such that the at least one upstream port connector of the second hub portion can be disconnected from the at least one other downstream port connector of the first hub portion by pulling the second hub portion away from the rim portion of the first hub portion; and
wherein the second hub portion further comprises a rotation interface plate adapted to fix the position of the at least one upstream port connector and to permit rotation of the at least one upstream port connector from a first position to at least a second position, said first position being on said first one of said second plurality of surfaces and parallel to the at least one downstream port connector, and said second position being on said first one of said second plurality of surfaces and orthogonal to said at least one downstream port connector.

13. The connectivity hub of claim 12, wherein each of the first and second plurality of port connectors comprises at least one of a USB port, a FireWire port, a serial port, a parallel port, and a power port.

14. The connectivity hub of claim 12, wherein the first hub portion further comprises a cable connected to the at least one electrical circuit of the first hub portion and to the at least one upstream port connector of the first hub portion.

15. The connectivity hub of claim 12, wherein the first hub portion is further adapted to include an LED indicator light, wherein the indicator light is adapted to illuminate when the at least one upstream port of the first hub portion is connected to the computer.

16. The connectivity hub of claim 15, wherein the LED indicator light is further adapted to display a first color and a second color, wherein the first color is displayed when the at least one upstream port of the first hub portion is connected to the computer, and wherein the second color is displayed when the at least one downstream port of the first hub portion is connected to the peripheral device.

17. The connectivity hub of claim 12, wherein the first one of said first plurality of surfaces is a side surface of the first hub portion, and the second one of said first plurality of surfaces is a top surface of the first hub portion.

18. The connectivity hub of claim 12, wherein the first one of said second plurality of surfaces is a bottom surface of the second hub portion, and the second one of said second plurality of surfaces is a top surface of the second hub portion.

* * * * *